United States Patent
Chen et al.

(10) Patent No.: US 10,931,189 B1
(45) Date of Patent: Feb. 23, 2021

(54) RECTIFIER CAPABLE OF ADJUSTING GATE VOLTAGE OF TRANSISTOR AND ALTERNATOR INCLUDING RECTIFIER

(71) Applicant: ACTRON TECHNOLOGY CORPORATION, Taoyuan (TW)

(72) Inventors: Wei-Jing Chen, Taoyuan (TW); Shang-Shu Chung, Taoyuan (TW); Huei-Chi Wang, Taoyuan (TW); Yen-Yi Chen, Taoyuan (TW)

(73) Assignee: ACTRON TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/660,687

(22) Filed: Oct. 22, 2019

(30) Foreign Application Priority Data

Sep. 12, 2019 (TW) ................................ 108133129

(51) Int. Cl.
| | | |
|---|---|---|
| H02M 1/08 | (2006.01) | |
| H02P 9/30 | (2006.01) | |
| H02M 7/217 | (2006.01) | |
| H02P 101/25 | (2016.01) | |

(52) U.S. Cl.
CPC ............ *H02M 1/08* (2013.01); *H02M 7/217* (2013.01); *H02P 9/305* (2013.01); *H02P 2101/25* (2015.01)

(58) Field of Classification Search
CPC .. H02M 1/08; H02M 1/36; H02M 2001/0025; H02P 9/305; H02P 2101/25
See application file for complete search history.

(56) References Cited

U.S. PATENT DOCUMENTS

| | | | |
|---|---|---|---|
| 6,573,689 B1* | 6/2003 | Renehan | H02P 9/305 |
| | | | 322/24 |
| 7,629,776 B2 | 12/2009 | Chemin et al. | |
| 7,868,595 B1* | 1/2011 | Smith | H02M 1/36 |
| | | | 323/222 |
| 9,453,886 B2* | 9/2016 | Makino | H03K 17/04 |
| 9,906,161 B1* | 2/2018 | Chen | H02M 7/217 |
| 2009/0140802 A1* | 6/2009 | Kitagawa | H03M 1/0663 |
| | | | 330/9 |

(Continued)

FOREIGN PATENT DOCUMENTS

| | | |
|---|---|---|
| CN | 101714804 | 1/2013 |
| TW | 201701577 | 1/2017 |
| TW | 1595737 | 8/2017 |

OTHER PUBLICATIONS

"Office Action of Taiwan Counterpart Application", dated Feb. 3, 2020, p. 1-p. 6.

*Primary Examiner* — Yusef A Ahmed
(74) *Attorney, Agent, or Firm* — JCIPRNET

(57) ABSTRACT

An alternator and a rectifier are provided. The rectifier includes a gate driving circuit, a logic circuit, and a comparison circuit. The gate driving circuit generates a gate voltage, and a control terminal of a transistor receives the gate voltage. The gate driving circuit receives a control signal, and adjusts the gate voltage according to the control signal, so as to control a conductivity degree of the transistor. The logic circuit generates the control signal and a switch signal according to a comparison result and selects a selected voltage according to the switch signal. The comparison result is generated by comparing a sensing voltage of a first terminal of the transistor with the selected voltage.

16 Claims, 7 Drawing Sheets

(56) References Cited

U.S. PATENT DOCUMENTS

| | | | |
|---|---|---|---|
| 2010/0039834 A1* | 2/2010 | Moon | H02M 3/33523 363/21.09 |
| 2011/0062925 A1* | 3/2011 | Han | G09G 3/3696 323/282 |
| 2011/0204866 A1* | 8/2011 | Moon | H02M 3/33523 323/284 |
| 2011/0205764 A1* | 8/2011 | Sheng | H02M 1/36 363/21.09 |
| 2012/0091978 A1* | 4/2012 | Ishii | H02M 1/36 323/271 |
| 2012/0300520 A1* | 11/2012 | Ren | H02M 3/33592 363/127 |
| 2013/0114307 A1* | 5/2013 | Fang | H02M 1/08 363/21.01 |
| 2014/0002043 A1* | 1/2014 | Li | H02M 3/156 323/282 |
| 2014/0132236 A1* | 5/2014 | Darmawaskita | H03K 4/502 323/283 |
| 2014/0218976 A1* | 8/2014 | Luo | H02M 1/08 363/21.01 |
| 2015/0042306 A1* | 2/2015 | Kim | G05F 1/561 323/350 |
| 2016/0011612 A1* | 1/2016 | Park | G09G 3/3233 345/212 |
| 2016/0105096 A1* | 4/2016 | Chen | H02M 1/4225 323/210 |
| 2016/0226239 A1* | 8/2016 | Yang | H02M 1/32 |
| 2016/0373019 A1* | 12/2016 | Hsu | H02M 3/33592 |
| 2018/0175737 A1* | 6/2018 | Kikuchi | H02M 3/335 |
| 2019/0107856 A1* | 4/2019 | Lim | G05F 1/575 |
| 2019/0165686 A1* | 5/2019 | Wang | H02M 1/08 |
| 2019/0170592 A1* | 6/2019 | Jeong | H03F 3/45179 |
| 2019/0296727 A1* | 9/2019 | Kruiskamp | H03K 17/302 |
| 2020/0052603 A1* | 2/2020 | Lu | H02M 3/3376 |

* cited by examiner ated States Patent

RECTIFIER CAPABLE OF ADJUSTING GATE VOLTAGE OF TRANSISTOR AND ALTERNATOR INCLUDING RECTIFIER

CROSS-REFERENCE TO RELATED APPLICATION

This application claims the priority benefit of Taiwan application serial no. 108133129, filed on Sep. 12, 2019. The entirety of the above-mentioned patent application is hereby incorporated by reference herein and made a part of this specification.

BACKGROUND

Technical Field

The disclosure relates to an alternator and a rectifier, and particularly relates to a rectifier capable of adjusting a gate voltage of a rectifier transistor.

Description of Related Art

In an alternator, a rectifier is often used to rectify an alternating current (AC) input voltage and generate a rectified voltage that may be regarded as a direct current (DC) voltage. According to the related art, the input voltage is often rectified by switching on or off a diode or a transistor. However, when the alternator does not generate electricity, a leakage current of the transistor may consume energy of a battery. Moreover, since noise affects a drain and a source of the transistor, a drain-source voltage is oscillated. When the drain-source voltage is oscillated around a conductive voltage of the rectifier, the transistor may be switched on or off by mistake.

SUMMARY

The disclosure is directed to an alternator and a rectifier, which are adapted to avoid switching on/off a transistor by mistake.

The disclosure provides a rectifier adapted to a transistor. The rectifier includes a gate driving circuit, a logic circuit, and a comparison circuit. The gate driving circuit is coupled to a control terminal of the transistor, and is configured to generate a gate voltage, and the control terminal of the transistor receives the gate voltage. The gate driving circuit receives a control signal, and adjusts the gate voltage according to the control signal, so as to control a conductivity degree of the transistor. The logic circuit is coupled to the gate driving circuit, and generates the control signal and a switch signal according to a comparison result, and selects a selected voltage according to the switch signal. The comparison result is generated by the comparison circuit by comparing a sensing voltage of a first terminal of the transistor with the selected voltage.

The disclosure provides an alternator including a rotor, a stator and a plurality of the aforementioned rectifiers. Each of the rectifiers receives a corresponding AC input voltage as an input voltage, and the rectifiers collectively generate a rectified voltage.

Based on the above description, the rectifier of the disclosure detects a drain voltage of the rectifier transistor to adjust the gate voltage of the rectifier transistor, and switches a comparison reference of the comparison circuit to avoid switching on/off the transistor by mistake, so as to improve a working performance.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
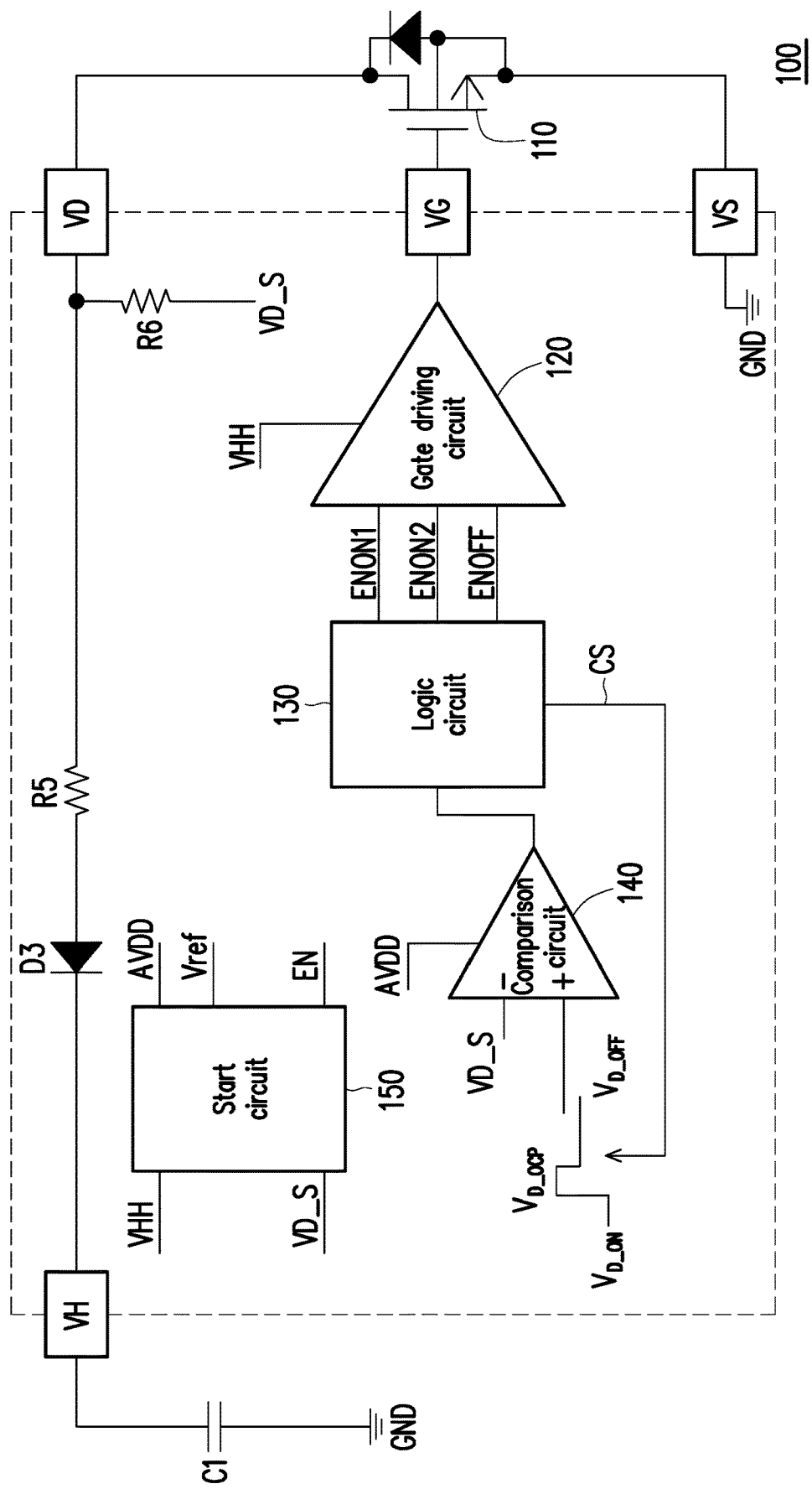
FIG. 1 is a schematic diagram of a rectifier according to an embodiment of the disclosure.

FIG. 1 is a schematic diagram of a rectifier according to an embodiment of the disclosure. Referring to FIG. 1, the rectifier 100 is adapted to a transistor 110, and the rectifier 100 includes a gate driving circuit 120, a logic circuit 130 and a comparison circuit 140. The gate driving circuit 120 is coupled to a control terminal of the transistor 110, and the gate driving circuit 120 provides a gate voltage VG to the control terminal of the transistor 110 to control a conductivity degree of the transistor 110. The logic circuit 130 is coupled to the gate driving circuit 120, and is configured to provide control signals to the gate driving circuit 120, and the gate driving circuit 120 adjusts the conductivity degree of the transistor 110 according to one of the control signals. The comparison circuit 140 is coupled to the logic circuit 130, the comparison circuit 140 may compare one of a plurality of selection voltages with a drain voltage VD of the transistor 110, and the logic circuit 130 generates the control signal according to a comparison result.

In the embodiment, the logic circuit 130 may provide a control signal ENON1, a control signal ENON2 and a control signal ENOFF. The gate driving circuit 120 may adjust the output gate voltage VG according to the control signal ENON1, the control signal ENON2 and the control signal ENOFF. For example, when the control signal ENON1 has a high logic level, and the control signal ENON2 and the control signal ENOFF all have a low logic level, the gate driving circuit 120 adjusts the gate voltage VG according to the control signal ENON1, such that the transistor 110 is switched on and has a first conductive impedance. When the control signal ENON2 has the high logic level, and the control signal ENON1 and the control signal ENOFF all have the low logic level, the gate driving circuit 120 adjusts the gate voltage VG according to the control signal ENON2, such that the transistor 110 is switched on and has a second conductive impedance. When the control signal ENOFF has the high logic level, and the control signal ENON1 and the control signal ENON2 all have the low logic level, the gate driving circuit 120 adjusts the gate voltage VG according to the control signal ENOFF, so as to switch off the transistor 110, where the first conductive impedance is smaller than the second conductive impedance.

In the embodiment, the logic circuit 130 provides 3 control signals to the gate driving circuit 120, which is only an example, and is not used for limiting an implementation scope of the disclosure. In other embodiments, the number of the control signals may be greater than or equal to 2, which is not particularly specified.

The logic circuit 130 may generate the control signals according to the comparison result of the comparison circuit 140, and generates a switch signal CS according to the comparison result. The comparison circuit 140 may compare one of a plurality of selection voltages with a sensing voltage VD_S, where the sensing voltage VD_S may be a sensing value of the drain voltage VD. Moreover, the comparison circuit 140 may switch a plurality of the selection voltages according to the switch signal CS. To be specific, a negative input terminal of the comparison circuit 140 receives the sensing voltage VD_S, and a positive input terminal of the comparison circuit 140 receives one of the plurality of selection voltages. The comparison circuit 140 may switch one of the selection voltages to another one of the selection voltages according to the switch signal CS.

Figure 2:
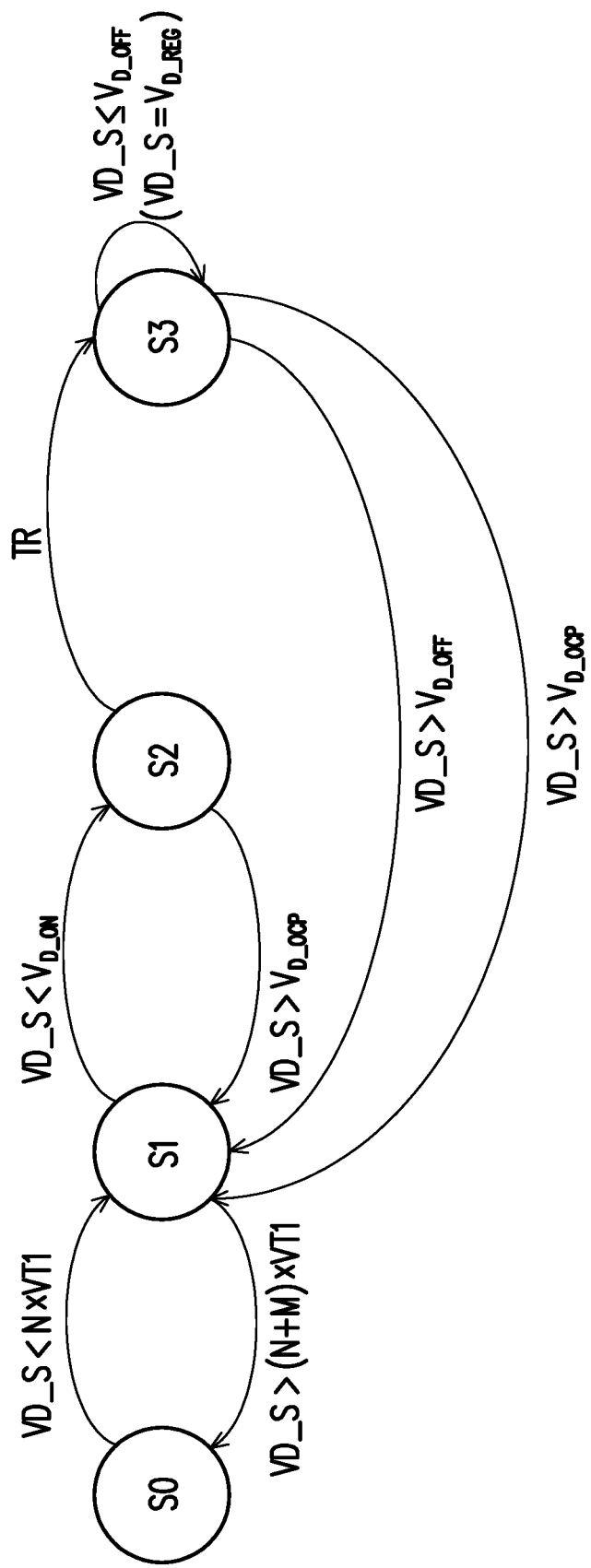
FIG. 2 is a schematic diagram of a state machine according to an embodiment of the disclosure.

FIG. 2 is a schematic diagram of a state machine according to an embodiment of the disclosure. Referring to FIG. 1 and FIG. 2, in the embodiment, the transistor 110 may be an N-type transistor, and the selection voltages are respectively a selection voltage $V_{D\_ON}$, a selection voltage $V_{D\_OCP}$ and a selection voltage $V_{D\_OFF}$, where the selection voltage $V_{D\_ON}$ is an initial selection voltage. The drain voltage VD decreases continuously after entering a negative half cycle. The comparison circuit 140 compares the sensing voltage VD_S with the selection voltage $V_{D\_ON}$, and when the sensing voltage VD_S is smaller than the selection voltage $V_{D\_ON}$, the logic circuit 130 generates the control signal ENON1 with the high logic level according to the comparison result. Now, the other control signals ENON2 and ENOFF may have the low logic level. The gate driving circuit 120 generates the gate voltage VG according to the control signal ENON1, and the transistor 110 is switched on and has the first conductive impedance. In this case, the transistor 110 may be completely switched on, so that the first conductive impedance of the transistor 110 is very tiny, and the drain voltage VD may be maintained be equal to or close to a voltage value of 0 volt. Now, the state machine is changed from a start state S1 to a first stage conductive state S2. Moreover, when the sensing voltage VD_S is smaller than the selection voltage $V_{D\_ON}$, the logic circuit 130 adjusts the switch signal CS. Moreover, the comparison circuit 140 selects the selection voltage $V_{D\_OCP}$ as a comparison reference according to the adjusted switch signal CS.

When the sensing voltage VD_S is smaller than or equal to the selection voltage $V_{D\_OCP}$, the state machine is maintained to the first stage conductive (rectifying) state S2. When the sensing voltage VD_S is greater than the selection voltage $V_{D\_OCP}$, the logic circuit 130 generates the control signal ENOFF with the high logic level according to the comparison result. Now, the other control signals ENON1 and ENON2 may have the low logic level. The gate driving circuit 120 generates the gate voltage VG according to the control signal ENOFF, so as to switch off the transistor 110. Now, the state machine is changed from the first stage conductive (rectifying) state S2 to the start state S1. Moreover, when the sensing voltage VD_S is greater than the selection voltage $V_{D\_OCP}$, the logic circuit 130 adjusts the switch signal CS. Moreover, the comparison circuit 140 selects the selection voltage $V_{D\_ON}$ as a comparison reference according to the adjusted switch signal CS.

In an actual operation, various circuit anomalies may probably result in the sensing voltage VD_S larger than the selection voltage $V_{D\_OCP}$. Now, the gate driving circuit 120 may switch off the transistor 110, and maintain the off state of the transistor 110 until the next negative half cycle of the drain voltage VD, so as to avoid oscillation of the sensing voltage VD_S near a conductive voltage of the transistor 110 to cause the transistor to switch on/off by mistake.

Comparatively, after the logic circuit 130 generates the control signal ENON1 for a time interval TR, the logic circuit 130 generates the control signal ENON2 with the high logic level. Now, the other control signals ENON1 and ENOFF may have the low logic level. A time counting circuit can be set in the logic circuit 130, and the time counting circuit may be implemented by a resistor-capacitor circuit or a timing circuit, so as to generate a value corresponding to a length of the time interval TR. The gate driving circuit 120 generates the gate voltage VG according to the control signal ENON2, so that the transistor 110 is partially switched on to have a second conductive impedance, where the second conductive impedance is greater than the first conductive impedance. Now, the state machine is changed from the first stage conductive (rectifying) state S2 to a second stage conductive (rectifying) state S3. Moreover, when the logic circuit 130 generates the control signal ENON1, and maintains for the time interval TR, the logic circuit 130 adjusts the switch signal CS. The comparison circuit 140 selects the selection voltage $V_{D\_OFF}$ as the comparison reference according to the adjusted switch signal CS.

When the sensing voltage VD_S is smaller than or equal to the selection voltage $V_{D\_OFF}$, the state machine is maintained to the second stage conductive (rectifying) state S3, and now the sensing voltage VD_S is equal to a regulation voltage $V_{D\_REG}$. When the sensing voltage VD_S is greater than the selection voltage $V_{D\_OFF}$, the logic circuit 130 generates the control signal ENOFF with the high logic level according to the comparison result. Now, the other control signals ENON1 and ENON2 may have the low logic level. The gate driving circuit 120 generates the gate voltage VG according to the control signal ENOFF, so as to switch off the transistor 110. Now, the state machine is changed from the second stage conductive (rectifying) state S3 to the start state S1. Moreover, when the sensing voltage VD_S is greater than the selection voltage $V_{D\_OFF}$, the logic circuit 130 adjusts the switch signal CS. Moreover, the comparison circuit 140 selects the selection voltage $V_{D\_ON}$ as a comparison reference according to the adjusted switch signal CS.

Moreover, in case a drain and a source of the transistor 110 are short-circuited, a large current flows through the transistor 110, and now a voltage value of the sensing voltage VD_S is rather high. Therefore, when the sensing voltage VD_S is equal to the regulation voltage $V_{D\_REG}$, the state machine is maintained to the second stage conductive (rectifying) state S3. When the sensing voltage VD_S is instantaneously larger than the selection voltage $VD_{D\_OCP}$, the state machine is quickly changed from the second stage conductive (rectifying) state S3 to the start state S1. Through such mechanism, the transistor 110 may be quickly switched off, so as to avoid damage of the transistor 110 due to the large current.

In the embodiment, one of a plurality of control signals may be enabled, and has a first logic level. The gate driving circuit 120 may generate the gate voltage VG according to the control signal of the first logic level, and control the conductivity degree of the corresponding transistor through the gate voltage VG. In the embodiment, the first logic level may be the high logic level. Alternatively, in other embodiments of the disclosure, the first logic level may be the low logic level.

In this way, the rectifier 100 of the disclosure may adjust the gate voltage VG of the transistor 110 according to the drain voltage VD of the transistor 110, so as to implement multi-stage control on the conductivity degree of the transistor 110 to achieve the rectifying effect. Implementation details of the gate driving circuit 120, the logic circuit 130 and the comparison circuit 140 are described below.

The logic circuit 130 is configured to generate the control signal ENON1, the control signal ENON2 and the control signal ENOFF according to the comparison result of the comparison circuit 140. For example, when the sensing signal VD_S is smaller than the selection voltage $V_{D\_ON}$, the logic circuit 130 outputs the control signal ENON1 of the high logic level, and now the control signal ENON2 and the control signal ENOFF all have the low logic level.

The comparison circuit 140 is configured to compare the sensing signal VD_S with one selection voltage. Moreover, the comparison circuit 140 may select one of the selection voltage $V_{D\_ON}$, the selection voltage $V_{D\_OCP}$ and the selection voltage $V_{D\_OFF}$ as the comparison reference according to the switch signal CS.

Figure 3:
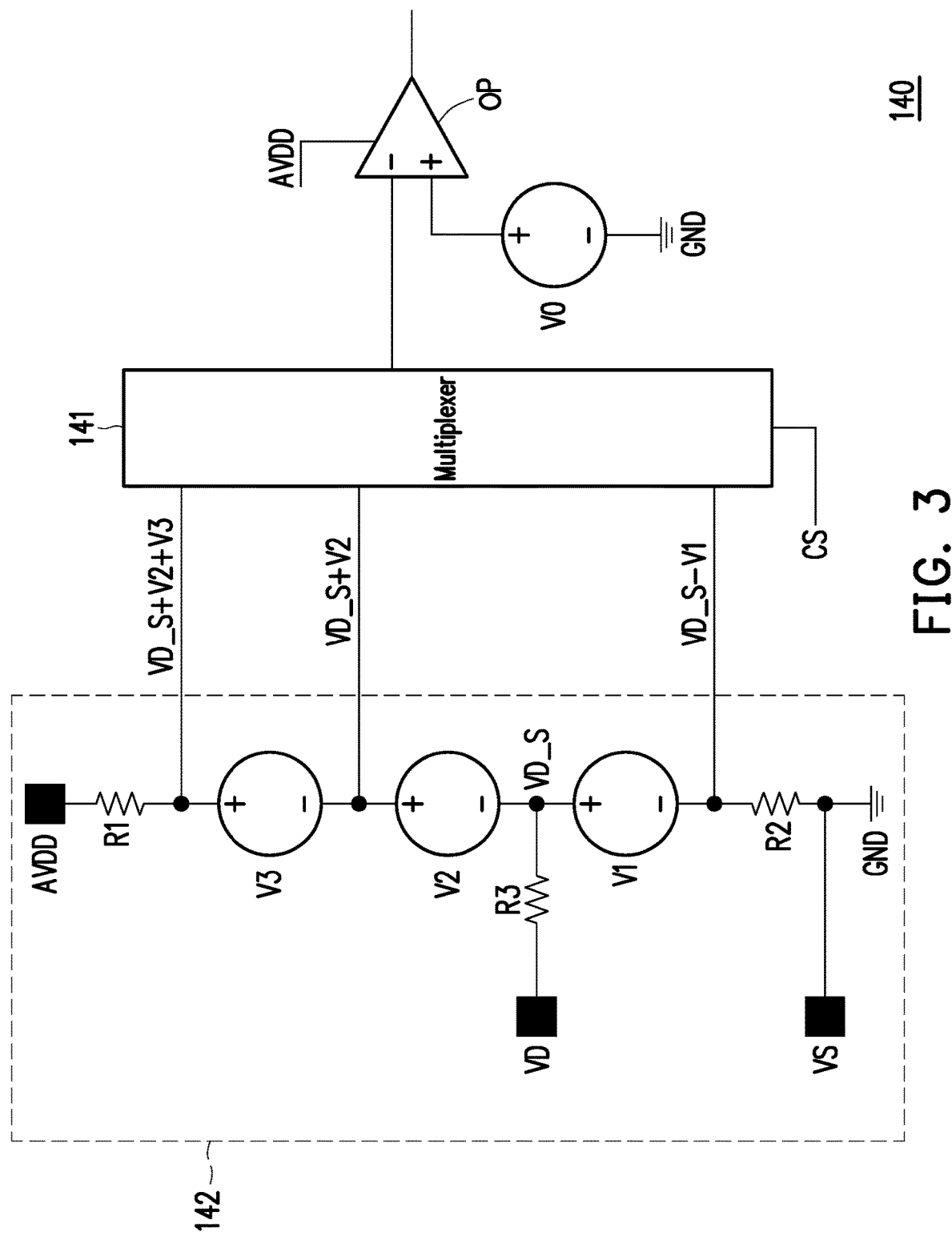
FIG. 3 is a schematic diagram of a comparison circuit according to an embodiment of the disclosure.

FIG. 3 is a schematic diagram of a comparison circuit according to an embodiment of the disclosure. Referring to FIG. 3, the comparison circuit 140 includes a voltage generating circuit 142, a multiplexer 141 and an operational amplifier OP. The voltage generating circuit 142 is coupled to the multiplexer 141, and the voltage generating circuit 142 receives the drain voltage VD, a source voltage VS, an operation power AVDD and a reference ground voltage GND.

The voltage generating circuit 142 includes a voltage source V1, a voltage source V2 and a voltage source V3 connected in series with each other. A first end of the voltage source V3 may be coupled to the operation power AVDD through a resistor R1. A first end of the voltage source V2 is coupled to a second end of the voltage source V3. A first end of the voltage source V1 is coupled to a second end of the voltage source V2, and a second end of the voltage source V1 may be coupled to the reference ground voltage GND through a resistor R2. The sensing voltage VD_S is provided to the first end of the voltage source V1, and the sensing voltage VD_S is generated by the drain voltage VD through a resistor R3. The source voltage VS is provided to one terminal of the resistor R2 adjacent to the reference ground voltage GND. In the embodiment, the source voltage VS may be equal to the reference ground voltage GND.

A first input terminal of the multiplexer 141 receives a voltage of the first end of the voltage source V3, and a voltage of the first input terminal of the multiplexer 141 is equal to a sum of the sensing voltage VD_S and voltage values of the the voltage source V2 and the voltage source V3. A second input terminal of the multiplexer 141 receives a voltage of the first end of the voltage source V2, and a voltage of the second input terminal of the multiplexer 141 is equal to a sum of the sensing voltage VD_S and the voltage source V2. A third input terminal of the multiplexer 141 receives a voltage of the second end of the voltage source V1, and a voltage of the third input terminal of the multiplexer 141 is equal to the sensing voltage VD_S minus the voltage source V1. The multiplexer 141 may output the voltage of the first input terminal of the multiplexer 141, the voltage of the second input terminal of the multiplexer 141, or the voltage of the third input terminal of the multiplexer 141 according to the switch signal CS.

The operational amplifier OP receives the operation voltage AVDD, the output voltage of the multiplexer 141 and a voltage source V0. The operational amplifier OP subtracts the output voltage of the multiplexer 141 from the voltage source V0 to generate the comparison result.

In the embodiment, the voltage source V0 may provide a voltage of 20 mV, the voltage source V1 may provide a voltage of 10 mV, the voltage source V2 may provide a voltage of 50 mV, and the voltage source V3 may provide a voltage of 270 mV. In this way, the voltage of the first input terminal of the multiplexer 141 is the sensing voltage VD_S plus the voltage of 320 mV, the voltage of the second input terminal of the multiplexer 141 is the sensing voltage VD_S plus the voltage of 50 mV, and the voltage of the third input terminal of the multiplexer 141 is the sensing voltage VD_S minus the voltage of 10 mV. The operational amplifier OP subtracts the output voltage of the multiplexer 141 from the voltage source V0 as the comparison result. When the output voltage of the multiplexer 141 is the sensing voltage VD_S plus the voltage of 320 mV, the comparison result is equivalent to a difference between the sensing voltage VD_S and a voltage of −300 mV. When the output voltage of the multiplexer 141 is the sensing voltage VD_S plus the voltage of 50 mV, the comparison result is equivalent to a difference between the sensing voltage VD_S and a voltage of −30 mV. When the output voltage of the multiplexer 141 is the sensing voltage VD_S minus the voltage of 10 mV, the comparison result is equivalent to a difference between the sensing voltage VD_S and a voltage of 30 mV.

Figure 4:
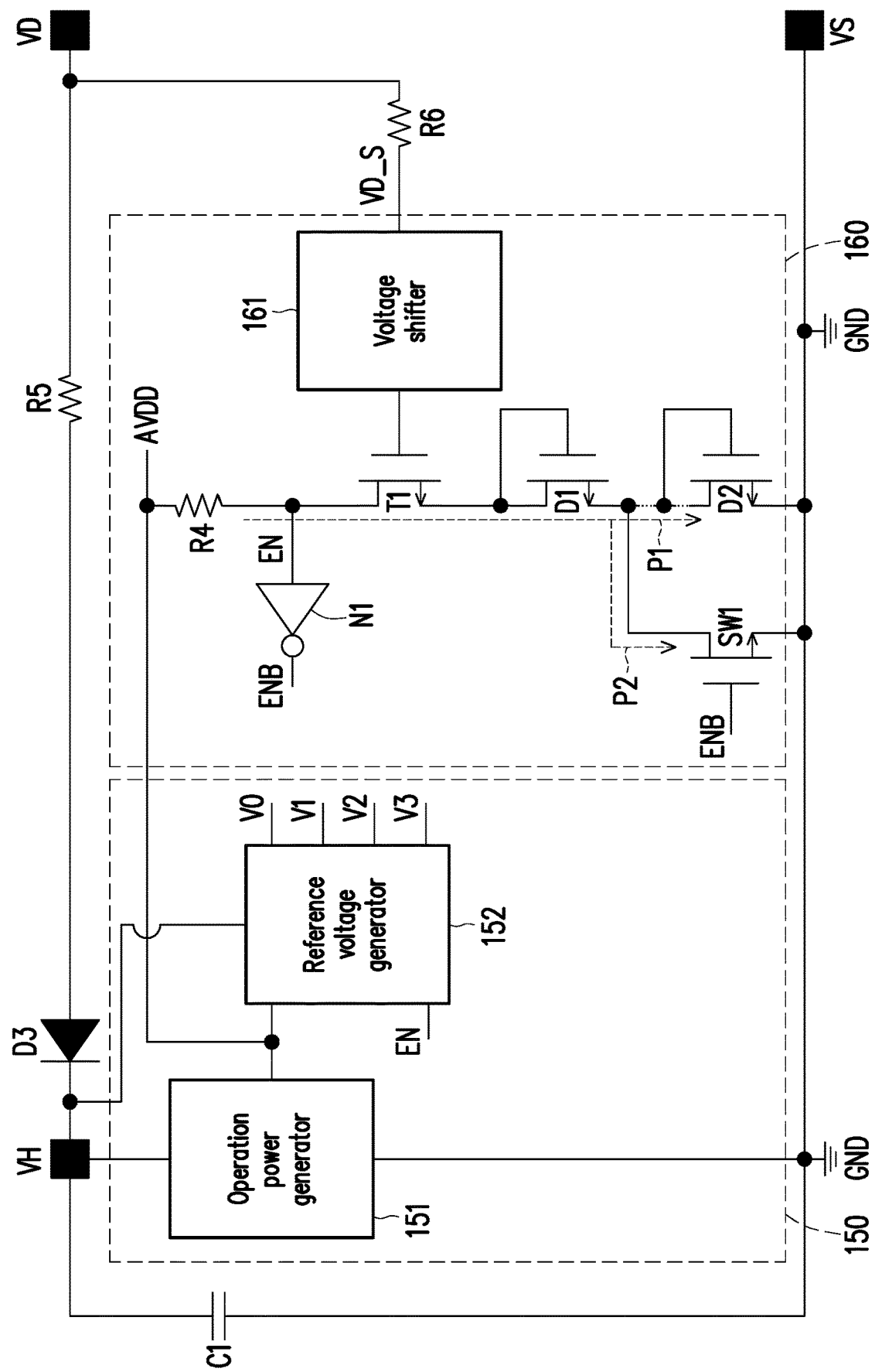
FIG. 4 is a schematic diagram of a part of a rectifier according to an embodiment of the disclosure.

Referring to FIG. 1, the rectifier 100 may further include a start circuit 150. The start circuit 150 is configured to provide the operation power AVDD of the comparison circuit 140 and a plurality of reference voltages Vref, where the reference voltages Vref may serve as the voltage sources V0-V3. FIG. 4 is a schematic diagram of a part of a rectifier according to an embodiment of the disclosure. Referring to FIG. 4, the start circuit 150 may include an operation power generator 151 and a reference voltage generator 152. A first terminal of the operation power generator 151 is coupled to a voltage VH, a second terminal of the operation power generator 151 is coupled to the reference ground voltage GND, and a third terminal of the operation power generator 151 provides the operation power AVDD. The reference voltage generator 152 receives the operation power AVDD, and provides the voltage source V0-V3 according to an enabling signal EN.

An enabling signal generating circuit 160 is configured to provide the enabling signal EN according to the sensing signal VD_S. In FIG. 4, the enabling signal generating circuit 160 includes a voltage shifter 161, a transistor T1, a diode D1, a diode D2, a switch SW1, an inverter N1 and a resistor R3. The diodes D1 and D2 may be diodes in the form of transistors. A first terminal of the resistor R4 is coupled to the operation power AVDD, and a second terminal of the resistor R4 provides the enabling signal EN. An input terminal of the inverter N1 is coupled to the second terminal of the resistor R4 to receive the enabling signal EN, and an output terminal of the inverter N1 outputs an inverted enabling signal ENB. A first terminal of the transistor T1 is coupled to a second terminal of the resistor R4, a second terminal of the transistor T1 is coupled to an anode of the diode D1, and the transistor T1 is controlled by an output voltage of the voltage shifter 161. An anode of the diode D2 is coupled to a cathode of the diode D1, and a cathode of the diode D2 is coupled to the reference ground voltage. A first terminal of the switch SW1 is coupled to the anode of the diode D2, a second terminal of the switch SW1 is coupled to the cathode of the diode D2, and the switch SW1 is controlled by the inverted enabling signal ENB. When the inverted enabling signal ENB has the high logic level, the switch SW1 is switched on, and is configured to bypass the diode D2.

In another embodiment, the switch SW1 may bypass the diode D1. In this case, the first terminal and the second terminal of the switch SW1 may be respectively coupled to the anode and the cathode of the diode D1. In another embodiment, the number of the diodes may be greater than 2, and the switch SW1 may be configured to bypass a plurality of diodes (for example, the diode D1 and the diode D2).

The voltage shifter 161 is configured to shift a voltage of the sensing signal VD_S, so as to provide the proper voltage to the transistor T1. Referring to FIG. 1 and FIG. 4, the rectifier 100 may further include a resistor R5, a resistor R6, a diode D3 and a capacitor C1. A first terminal of the resistor R6 is coupled to the drain voltage VD, and a second terminal of the resistor R6 provides the sensing signal VD_S. A first terminal of the resistor R5 is coupled to the drain voltage VD. An anode of the diode D3 is coupled to a second terminal of the resistor R5, and a cathode of the diode D3 is coupled to the voltage VH. The capacitor C1 is coupled between the voltage VH and the reference ground voltage GND.

Referring to FIG. 2 and FIG. 4, when the drain voltage VD is greater than or equal to a sum of the conductive voltage of the transistor T1, a conductive voltage of the diode D1 and a conductive voltage of the diode D2, the transistor T1 is switched on to form a path P1. Now, the enabling signal EN is pulled down to the low logic level, and the inverted enabling signal ENB has the high logic level, the path P1 is cut off, the path P2 is formed, and the state machine is in a standby state S0. Namely, a start condition of the enabling signal generating circuit 160 is that the drain voltage VD is smaller than N×VT1, where VT1 represents the conductive voltage of the transistor, and N is a positive integer. In the embodiment, N is equal to 2, and N×VT1 may be provided by the transistor T1 and the diode D1. When the drain voltage VD is smaller than N×VT1, the transistor T1 provides an impedance, and the voltage of the enabling signal EN is pulled up and transited to the high logic level based on a voltage divider rule, and the inverted enabling signal ENB is transited to the low logic level, the path P2 is cut off, and the path P1 is formed. Now, the state machine is changed from the standby state S0 to the start state S1.

Comparatively, when the drain voltage VD is greater than a voltage of (N+M)×VT1, the transistor T1 is switched on, and the enabling signal EN is transited to the low logic level, and the inverted enabling signal ENB is transited to the high logic level. Now, the state machine is changed from the start state S1 to the standby state S0. Where, M is a positive integer, and the voltage of M×VT1 may be provided by the diode D2. In the embodiment, M is equal to 1.

Figure 5:
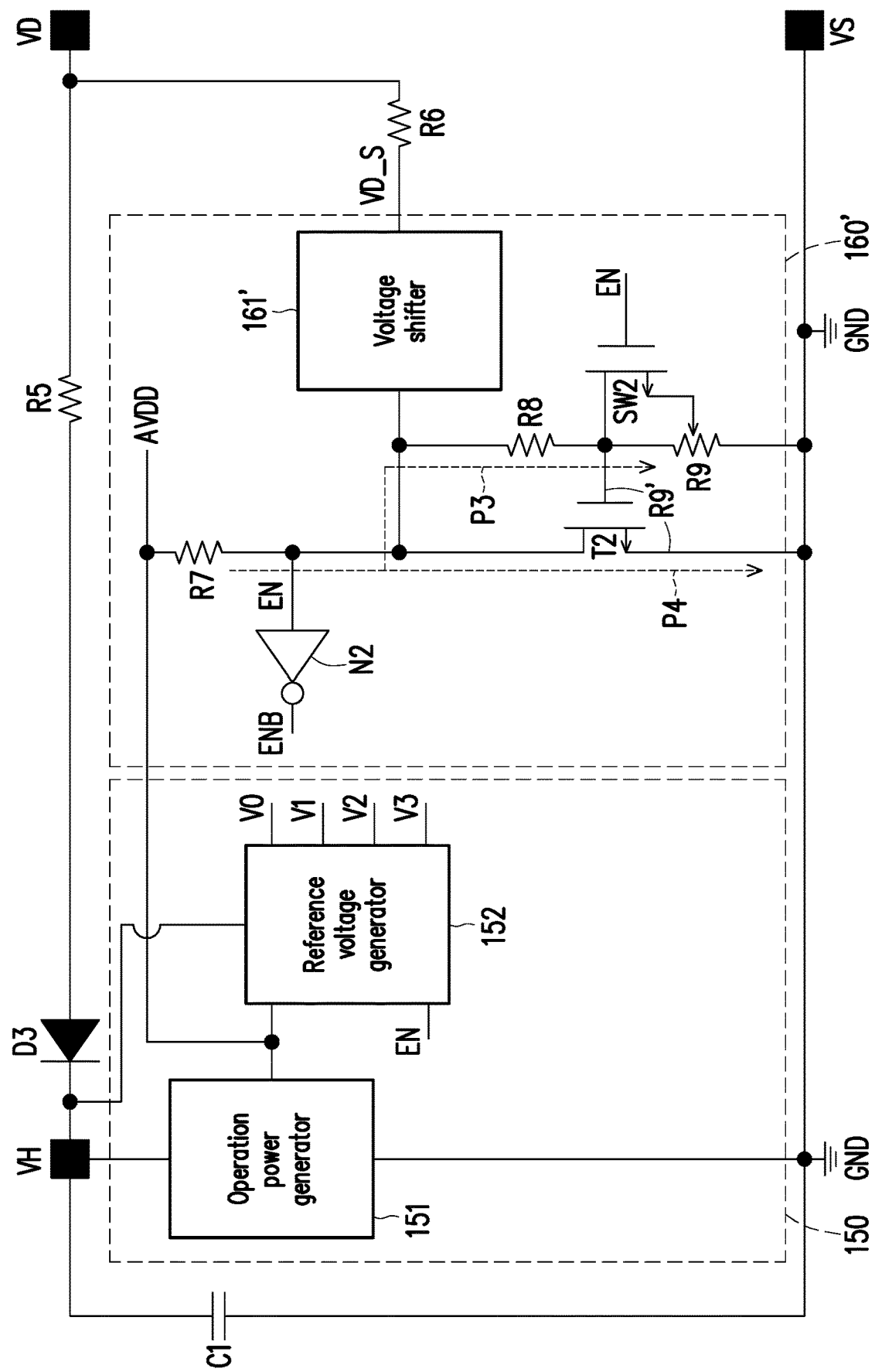
FIG. 5 is a schematic diagram of a part of a rectifier according to an embodiment of the disclosure.

FIG. 5 is a schematic diagram of a part of a rectifier according to an embodiment of the disclosure. A difference between FIG. 5 and FIG. 4 lies in an enabling signal generating circuit 160', and descriptions of other components of FIG. 5 may refer to related description of the embodiment of FIG. 4, which are not repeated. Referring to FIG. 5, the enabling signal generating circuit 160' includes resistors R7-R9, a transistor T2, an inverter N2, a switch SW2 and a voltage shifter 161'. A first terminal of the resistor R7 is coupled to the operation power AVDD, and a second terminal of the resistor R7 provides the enabling signal EN. An input terminal of the inverter N2 is coupled to the second terminal of the resistor R7 to receive the enabling signal EN, and an output terminal of the inverter N2 outputs the inverted enabling signal ENB. A first terminal of the transistor T2 is coupled to the second terminal of the resistor R7, and a second terminal of the transistor T2 is coupled to the reference ground voltage GND. A first terminal of the resistor R8 is coupled to the first terminal of the transistor T2, a first terminal of the resistor R9 is coupled to a second terminal of the resistor R8, and a second terminal of the resistor R9 is coupled to the reference ground voltage GND. To be specific, the switch SW2 and the resistor R9 may form a variable resistor, the first terminal of the resistor R9 is coupled to the first terminal of the switch SW2, the second terminal of the resistor R9 is coupled to the reference ground voltage GND, and a third terminal of the resistor R9 is coupled to the second terminal of the switch SW2. The switch SW2 is constructed by a transistor, and is controlled by the enabling signal EN. In the embodiment, when the enabling signal EN has the high logic level, the switch SW2 is switched on to decrease a resistance between the control terminal of the transistor T2 and the reference ground voltage GND (which is smaller than a resistance R9' of the resistor R9). Now, when the drain voltage is raised to [(R9'+R8)/R9']×VT2 from a low level, the transistor T2 is switched on, and the enabling signal EN is changed from the high logic level to the low logic level. Comparatively, when the enabling signal EN has the low logic level, the switch SW2 is switched off to increase the resistance between the control terminal of the transistor T2 and the reference ground voltage GND (which is equal to the resistance of the resistor R9). When the drain voltage is dropped to [(R9+R8)/R9]×VT2 from a high level, the transistor T2 is switched off, and the enabling signal EN is changed from the low logic level to the high logic level.

According to the above description, it is learned that through the variable resistor formed by the switch SW2 and the resistor R9, the conductivity degree of the transistor T2 may be adjusted according to the enabling signal EN. Moreover, description of the voltage shifter 161' is the same with that of the voltage shifter 161 of the embodiment of FIG. 4, and detail thereof is not repeated.

In the embodiment of FIG. 5, the resistor R8 and the resistor R9 are configured to provide N×VT1 and (N+M)×VT1 mentioned in the embodiment of FIG. 4. Referring both of FIG. 2 and FIG. 5, when the drain voltage VD is greater than or equal to (N+M)×VT1, a path P3 is formed, and the transistor T2 is controlled by the voltage of the first terminal of the resistor R9 and is at least partially switched on, so that the enabling signal EN is pulled down to the low logic level. Now, the state machine is in the standby state S0. When the drain voltage VD is smaller than NXVT1, the voltage of the first terminal of the resistor R9 is decreased, causing the transistor T2 to be switched off and a path P4 to be cut off. Now, the voltage of the enabling signal EN becomes higher based on the voltage divider rule, the enabling signal EN is accordingly transited to the high logic level, the inverted enabling signal ENB is transited to the low logic level, and a part of the resistor R9 is bypassed by the switch SW2. Now, the sate machine is changed from the standby state S0 to the start state S1.

Comparatively, when the drain voltage VD is greater than (N+M)×VT1, the transistor T2 is switched on, and the enabling signal EN is transited to the low logic level, and the inverted enabling signal ENB is transited to the high logic level. Now, the state machine is changed from the start state S1 to the standby state S0, where M×VT1 may be provided by the transistor T2. In the embodiment, if R9=2×R9'=2×R8, N is equal to 1.5 and M is equal to 0.5.

Figure 6:
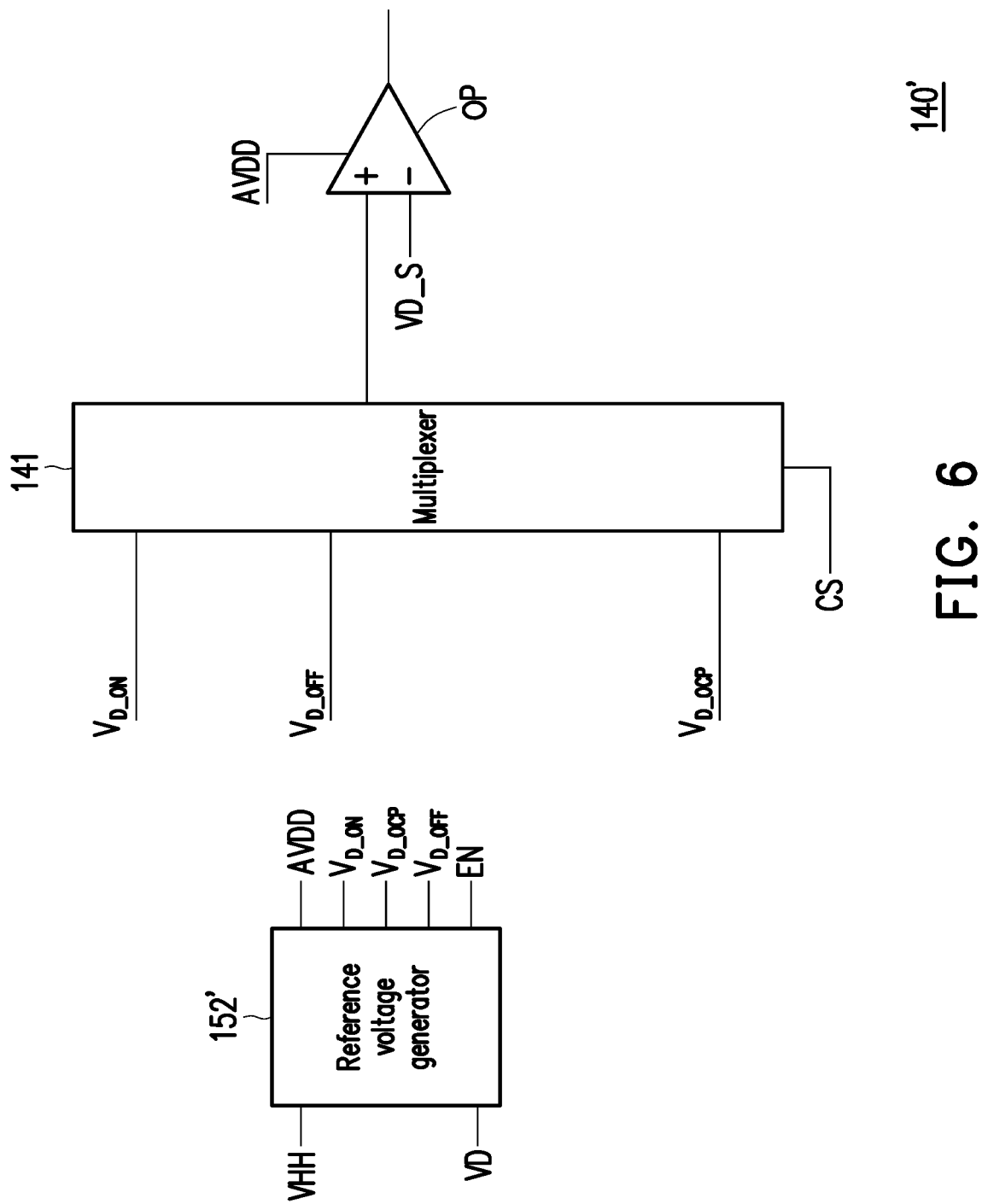
FIG. 6 is a schematic diagram of a comparison circuit according to an embodiment of the disclosure.

In the above embodiment, voltage values of the selection voltage $V_{D\_ON}$, the selection voltage $V_{D\_OCP}$ and the selection voltage $V_{D\_OFF}$ are respectively equal to −300 mV, 30 mV and −30 mV. In another embodiment, the voltage values of the selection voltage $V_{D\_ON}$, the selection voltage $V_{D\_OCP}$ and the selection voltage $V_{D\_OFF}$ may be directly provided to the positive input terminal of the operational amplifier OP. FIG. 6 is a schematic diagram of a comparison circuit according to an embodiment of the disclosure. Referring to FIG. 6, the comparison circuit 140' only includes the operational amplifier OP and the multiplexer 141. In the embodiment, a reference voltage generator 152' is configured to receive an operation power VHH and the drain voltage VD, and generates the operation power AVDD of the operational amplifier OP, the selection voltage $V_{D\_ON}$, the selection voltage $V_{D\_OCP}$ and the selection voltage $V_{D\_OFF}$ according to the enabling signal EN. The multiplexer 141 selects the selection voltage $V_{D\_ON}$, the selection voltage $V_{D\_OCP}$ or the selection voltage $V_{D\_OFF}$ according to the switch signal CS. The operational amplifier OP receives the operation power AVDD, the positive input terminal of the operational amplifier OP receives the output voltage of the multiplexer 141, the negative input terminal of the operational amplifier OP is coupled to the sensing voltage VD_S, and the operational amplifier OP outputs a voltage difference between the positive input terminal and the negative input terminal. A generation detail of the enabling signal EN of the embodiment may refer to the related descriptions of the embodiments of FIG. 4 and FIG. 5, which is not repeated.

Figure 7:
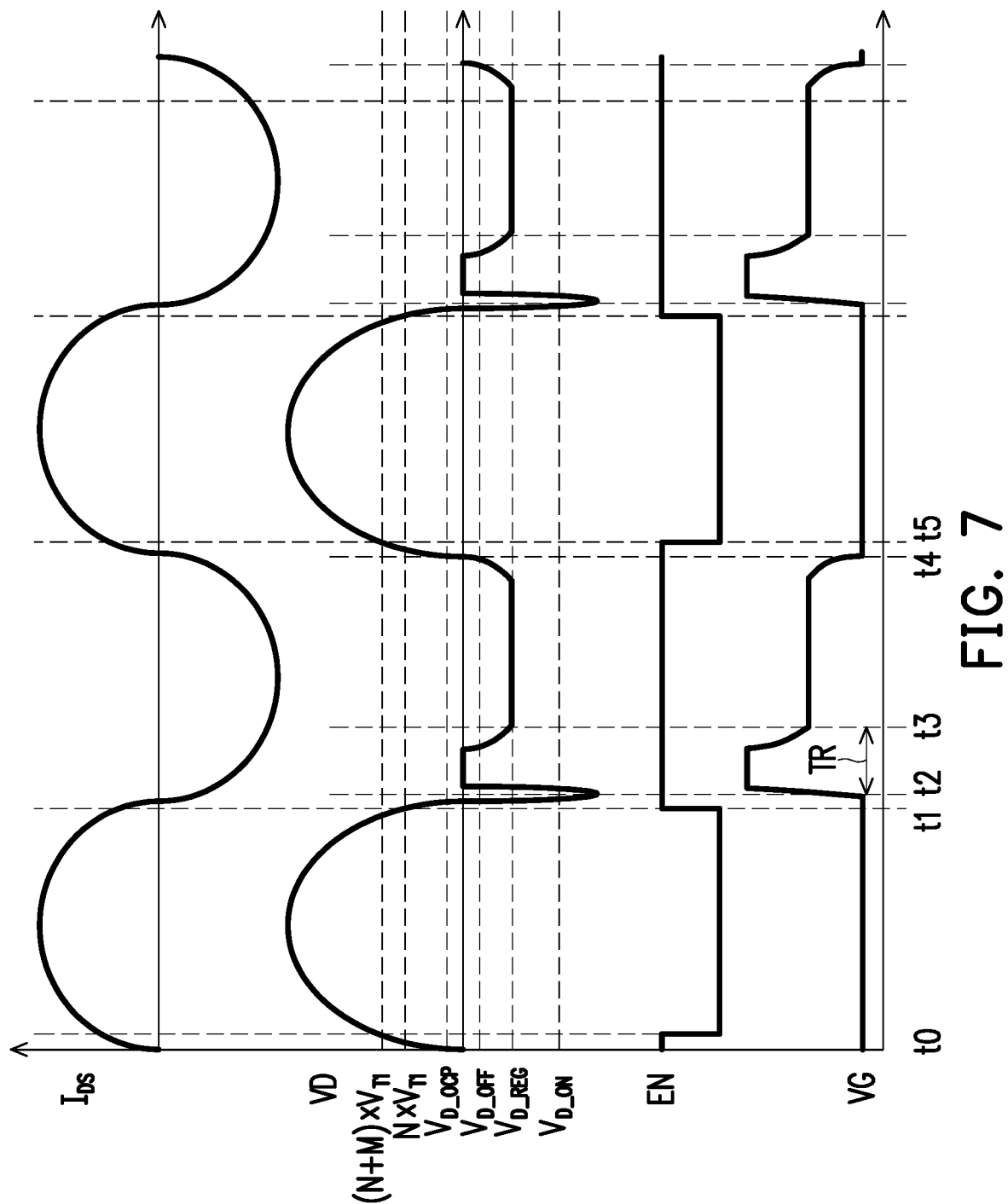
FIG. 7 is a waveform schematic diagram according to an embodiment of the disclosure.

FIG. 7 is a waveform schematic diagram according to an embodiment of the disclosure. In FIG. 7, variations of a drain current IDS, the drain voltage VD, the enabling signal EN and the gate voltage VG are drawn. Referring to FIG. 2 and FIG. 7, at a time point t1, the enabling signal EN is transited from the low logic level to the high logic level, and now the start circuit generates a plurality of reference voltages Vref. The drain voltage VD decreases continuously after entering a negative half cycle. When the drain voltage VD is greater than or equal to N×VT1, the state machine is maintained to the standby state S0. When the drain voltage VD is smaller than N×VT1 (corresponding to the time point t1), the state machine is changed from the standby state S0 to the start state S1. When the drain voltage VD is smaller than the selection voltage $V_{D\_ON}$ (corresponding to a time point t2), the state machine is changed from the start state S1 to the first stage conductive (rectifying) state S2, until a time point t3. Then, at the time point t3 after the time interval TR, the state machine is changed to the second stage conductive (rectifying) state S3. Under the second stage conductive (rectifying) state S3, the drain voltage VD is decreased, and is maintained to the regulation voltage VD=$V_{D\_REG}$. When the drain voltage VD is raised and greater than the selection voltage $V_{D\_OFF}$ (corresponding to a time point t4), the state machine is changed to the start state S1. Now, the gate voltage VG is decreased, and the transistor executing the rectifying operation is switched off. When the drain voltage VD is greater than the selection voltage (N+M)×VT1 (corresponding to a time point t5), the state machine is changed to the standby state S0.

Moreover, in the disclosure, the enabling signal of the control circuit may also be switched off when power is not generated, so that the current consumption can be controlled to the minimum to reduce a leakage current of the transistor.

In summary, in the disclosure, the gate voltage may be adjusted by detecting the drain voltage. Through the configuration of the disclosure, the leakage current of the transistor may be reduced, so as to avoid excessive energy consumption. Moreover, during the rectification of the transistor, the selection voltage is switched to avoid switching on/off the transistor by mistake.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A rectifier comprising:
   a transistor;
   a gate driving circuit coupled to a control terminal of the transistor and configured to generate a gate voltage, the control terminal of the transistor receiving the gate voltage, wherein the gate driving circuit receives a control signal, and adjusts the gate voltage according to the control signal, so as to control a conductivity degree of the transistor, wherein the conductivity degree of the transistor comprises a first stage conductive state and a second stage conductive state after the first stage conductive state is maintained for a predetermined time interval, and in the second stage conductive state, a drain voltage of the transistor decreases and is maintained at a regulation voltage; and
   a logic circuit coupled to the gate driving circuit, generating the control signal and a switch signal according to a comparison result, and selecting a selected voltage according to the switch signal, wherein the comparison result is generated by comparing a sensing voltage of a first terminal of the transistor with the selected voltage, wherein the sensing voltage is a sensing value of the drain voltage.

2. The rectifier according to claim 1, further comprising:
   a comparison circuit coupled to the logic circuit and the first terminal of the transistor and configured to generate the comparison result.

3. The rectifier according to in claim 2, wherein the comparison circuit selects one of a first selection voltage, a second selection voltage, and a third selection voltage as the selected voltage according to the switch signal, wherein a voltage value of the first selection voltage is smaller than a voltage value of the third selection voltage, and the voltage value of the third selection voltage is smaller than a voltage value of the second selection voltage.

4. The rectifier according to claim 3, wherein when the sensing voltage is smaller than the first selection voltage, the conductivity degree of the transistor enters the first stage conductive state, the logic circuit generates the control signal having a first voltage according to the comparison result, the gate driving circuit switches on the transistor according to the control signal having the first voltage to provide a first conductive impedance, and the logic circuit adjusts the switch signal, so that the comparison circuit selects the second selection voltage as the selected voltage according to the switch signal.

5. The rectifier according to claim 4, wherein when the sensing voltage is greater than the second selection voltage, the logic circuit generates the control signal having a second voltage according to the comparison result, the gate driving circuit switches off the transistor according to the control signal having the second voltage, and the logic circuit adjusts the switch signal, so that the comparison circuit selects the first selection voltage as the selected voltage according to the switch signal.

6. The rectifier according to claim 4, wherein in the second stage conductive state after the first stage conductive state is maintained for the predetermined time interval, the logic circuit generates the control signal having a second voltage, so that the gate driving circuit switches on the transistor according to the control signal having the second voltage to provide a second conductive impedance, and the logic circuit adjusts the switch signal, so that the comparison circuit selects the third selection voltage as the selected voltage according to the switch signal.

7. The rectifier according to claim 6, wherein when the sensing voltage is greater than the third selection voltage, the logic circuit generates the control signal according to the comparison result, so that the gate driving circuit switches off the transistor according to the control signal, and the logic circuit adjusts the switch signal, so that the comparison circuit selects the first selection voltage as the selected voltage according to the switch signal.

8. The rectifier according to claim 3, further comprising:
a start circuit coupled to the comparison circuit and configured to generate the first selection voltage, the second selection voltage, and the third selection voltage according to an enabling signal,
wherein the comparison circuit comprises:
a multiplexer receiving the first selection voltage, the second selection voltage, and the third selection voltage, and selecting one of the first selection voltage, the second selection voltage, and the third selection voltage as the selected voltage according to the switch signal; and
an operational amplifier coupled to the multiplexer, configured to receive the selected voltage and the sensing voltage, and comparing the selected voltage and the sensing voltage to generate the comparison result.

9. The rectifier according to claim 8, wherein the start circuit comprises:
a first resistor having a first terminal receiving an operation voltage;
a first transistor having a first terminal coupled to a second terminal of the first resistor, the first transistor being controlled by the sensing voltage, wherein the second terminal of the first resistor provides the enabling signal;
a plurality of diodes connected in series in a forward-biased manner between a second terminal of the first transistor and a reference ground voltage; and
a first switch configured to bypass at least one of the plurality of diodes and controlled by an inverted enabling signal.

10. The rectifier according to claim 8, wherein the start circuit comprises:
a first resistor having a first terminal receiving an operation voltage;
a first transistor having a first terminal coupled to a second terminal of the first resistor, and a second terminal coupled to a reference ground signal, wherein the second terminal of the first resistor provides the enabling signal;

a second resistor having a first terminal coupled to the second terminal of the first resistor;
a variable resistor having a first terminal coupled to a second terminal of the second resistor, and a second terminal coupled to the reference ground signal; and
a first switch configured to bypass a part of impedance of the variable resistor and controlled by the enabling signal,
wherein the first transistor is controlled by a voltage of the first terminal of the variable resistor.

11. The rectifier according to claim 3, wherein the comparison circuit comprises:
a voltage generating circuit generating a first voltage, a second voltage, and a third voltage according to the sensing voltage, a first voltage source, a second voltage source, and a third voltage source;
a multiplexer selecting the first voltage, the second voltage, or the third voltage as an output voltage according to the switch signal; and
an operational amplifier coupled to the multiplexer and subtracting the output voltage of the voltage generating circuit from a fourth voltage source to generate the comparison result.

12. The rectifier according to claim 11, further comprising:
a start circuit coupled to the comparison circuit and configured to provide the first voltage source, the second voltage source, the third voltage source, and the fourth voltage source according to an enabling signal.

13. The rectifier according to claim 11, wherein the first voltage is equal to a sum of the sensing voltage, a voltage value of the second voltage source and a voltage value of the third voltage source, the second voltage is equal to a sum of the sensing voltage and the voltage value of the second voltage source, and the third voltage is equal to the sensing voltage minus a voltage value of the first voltage source.

14. The rectifier according to claim 11, wherein the start circuit comprises:
a first resistor having a first terminal receiving an operation voltage;
a first transistor having a first terminal coupled to a second terminal of the first resistor, the first transistor being controlled by the sensing voltage, wherein the second terminal of the first resistor provides the enabling signal;
a plurality of diodes connected in series in a forward-biased manner between a second terminal of the first transistor and a reference ground voltage; and
a first switch configured to bypass at least one of the plurality of diodes and controlled by an inverted enabling signal.

15. The rectifier according to claim 11, wherein the start circuit comprises:
a first resistor having a first terminal receiving an operation voltage;
a first transistor having a first terminal coupled to a second terminal of the first resistor, and a second terminal coupled to a reference ground signal, wherein the second terminal of the first resistor provides the enabling signal;
a second resistor having a first terminal coupled to the second terminal of the first resistor;
a variable resistor having a first terminal coupled to a second terminal of the second resistor, and a second terminal coupled to the reference ground signal; and a first switch configured to bypass a part of impedance of the variable resistor and controlled by the enabling signal, wherein the first transistor is controlled by a voltage of the first terminal of the variable resistor.

16. An alternator comprising:

a rotor;

a stator coupled to the rotor and generating a plurality of alternating current input voltages; and a plurality of rectifiers, each of the rectifiers being the rectifier recited in claim 1, and each of the rectifiers receiving the corresponding alternating current input voltage, wherein the rectifiers collectively generate a rectified voltage.

* * * * *